US012755583B2

(12) United States Patent
Jung et al.

(10) Patent No.: US 12,755,583 B2
(45) Date of Patent: Oct. 6, 2026

(54) SYSTEM AND METHOD OF IDENTIFYING EQUIPMENT

(71) Applicant: CQMS PTY LTD, Murarrie (AU)

(72) Inventors: Myoungki Jung, Brisbane (AU); Kevin Greenwood, Brisbane (AU); Nick Hillier, Brisbane (AU); Ian Hamilton, Brisbane (AU)

(73) Assignee: CQMS RAZER PTY LTD, Cannon Hill (AU)

( * ) Notice: Subject to any disclaimer, the term of this patent is extended or adjusted under 35 U.S.C. 154(b) by 90 days.

(21) Appl. No.: 18/686,237

(22) PCT Filed: Aug. 23, 2022

(86) PCT No.: PCT/AU2022/050960
§ 371 (c)(1),
(2) Date: Feb. 23, 2024

(87) PCT Pub. No.: WO2023/023733
PCT Pub. Date: Mar. 2, 2023

(65) Prior Publication Data

US 2024/0386756 A1 Nov. 21, 2024

(30) Foreign Application Priority Data

Aug. 23, 2021 (AU) ................................ 2021902654

(51) Int. Cl.
*G07C 5/00* (2006.01)
*E02F 9/20* (2006.01)
(Continued)

(52) U.S. Cl.
CPC ................ *G07C 5/008* (2013.01); *E02F 9/26* (2013.01); *G01G 19/08* (2013.01);
(Continued)

(58) Field of Classification Search
CPC .. G07C 5/008; G07C 5/02; G07C 5/08; E02F 9/26; E02F 3/435; E02F 9/205;
(Continued)

(56) References Cited

U.S. PATENT DOCUMENTS 10,311,657 B2 * 6/2019 Collins .................... G07C 5/08
11,131,082 B2 * 9/2021 Sherlock ................. E02F 9/264
(Continued)

FOREIGN PATENT DOCUMENTS

JP 2014047487 A 3/2014

OTHER PUBLICATIONS

International Preliminary Report on Patentability for PCT Application Serial No. PCT/AU2022/050960, dated Dec. 4, 2023, 8 pages.
(Continued)

*Primary Examiner* — Tyler D Paige
(74) *Attorney, Agent, or Firm* — Kinney & Lange, P.A.

(57) ABSTRACT

Disclosed is an equipment identification system, the equipment preferably, although not exclusively, in the form of a truck, the system comprising a sensor located on the truck, the sensor configured to sense movement of the truck and generate movement data associated with the truck; a transmitter configured to transmit truck identification data associated with the truck and the movement data; a receiver in communication with the transmitter, the receiver configured to receive the truck identification data and the movement data from the transmitter; and a management system in communication with the receiver, the management system configured to identify the truck and also determine whether the truck is currently being loaded by an excavator based on the truck identification data and the movement data.

18 Claims, 3 Drawing Sheets

(51) Int. Cl.

| | |
|---|---|
| ***E02F 9/26*** | (2006.01) |
| ***G01G 19/08*** | (2006.01) |
| ***G06Q 10/06*** | (2023.01) |
| ***G06Q 10/0631*** | (2023.01) |
| ***G07C 5/02*** | (2006.01) |
| ***G07C 5/08*** | (2006.01) |
| ***G08C 17/02*** | (2006.01) |
| ***H04L 67/12*** | (2022.01) |

(52) U.S. Cl.
CPC ........... *G06Q 10/0631* (2013.01); *G07C 5/02* (2013.01); *G08C 17/02* (2013.01); *H04L 67/12* (2013.01)

(58) Field of Classification Search
CPC ......... E02F 9/262; E02F 9/2054; E02F 3/434; G01G 19/08; G06Q 10/0631; G06Q 10/06; G06Q 50/02; G08C 17/02; H04L 67/12; H04W 4/025; H04W 4/38; H04W 4/80; B60P 1/04; B60Y 2200/145; B60Y 2200/412; G01P 15/00
USPC .......................................................... 701/34.2
See application file for complete search history.

(56) References Cited

U.S. PATENT DOCUMENTS

| | | | |
|---|---|---|---|
| 2009/0063222 | A1 | 3/2009 | Doan et al. |
| 2012/0084047 | A1 | 4/2012 | Vesterdal et al. |
| 2015/0264866 | A1 | 9/2015 | Foster et al. |
| 2017/0147958 | A1* | 5/2017 | Hatfield ......... G06Q 10/063114 |
| 2017/0167109 | A1* | 6/2017 | Ge .......................... E02F 9/265 |
| 2018/0087240 | A1 | 3/2018 | Schmitt et al. |
| 2018/0174377 | A1* | 6/2018 | Collins ................... E02F 9/261 |
| 2020/0211300 | A1 | 7/2020 | Helms et al. |
| 2020/0352099 | A1 | 11/2020 | Meier et al. |
| 2024/0386756 | A1* | 11/2024 | Jung ...................... G06Q 10/06 |

OTHER PUBLICATIONS

International Search Report and Written Opinion from PCT Application Serial No. PCT/AU2022/050960, dated Oct. 14, 2022, 9 pages.

* cited by examiner

SYSTEM AND METHOD OF IDENTIFYING EQUIPMENT

CROSS-REFERENCE TO RELATED APPLICATION(S)

This application is a Section 371 National Stage Application of International Application No. PCT/AU2022/050960, filed on Aug. 23, 2022, entitled "A SYSTEM AND METHOD OF IDENTIFYING EQUIPMENT", which claims priority to Australian Application No. 2021902654, filed on Aug. 23, 2021, the contents of which are incorporated herein by referenced in their entireties.

TECHNICAL FIELD

The present disclosure relates to a system and method of identifying equipment. In particular, although not exclusively, this disclosure relates to a system and method of identifying a truck in an excavation environment.

BACKGROUND

References to background art herein is not to be construed as an admission that such art constitutes common general knowledge.

Excavators on mining sites move payloads in the form of excavated material such as earthen material, ore and the like. The excavated material is delivered utilising the bucket of the excavator to trucks, conveyor hoppers or other like machinery. Trucks deliver the excavated material to further destinations on the mining site for either processing in the case of ore or to waste dumps in the case of non-ore bearing material.

It is desirable to have high utilisation rates for all heavy equipment on a mine site but it is particularly desirable to optimise the utilisation rate of excavators. As such, when an excavator is working on earthen material there are often a number of trucks that are queued to receive the earthen payload from the excavator bucket so that, as soon as a truck is filled, it can move away and the next truck can be immediately filled. In this way, the excavators' utilisation rates may be optimised.

There are also efficiency issues to consider during the process of loading a truck. During the dig and dump cycle the excavator fills its bucket with the earthen material and dumps the payload into the truck tray. However, there are a variety of different trucks with differing tray capacities operating on a particular mine site at any time and it is important to ensure that the excavator fills the truck tray to its capacity. Underfilling a truck tray is inefficient as the payload carried in the tray to the destination is sub-optimal. Furthermore, overfilling a truck tray beyond the capacity of the truck tray is dangerous, can damage the truck and may result in accidents.

As such, there are known systems that facilitate communication between the truck and the excavator to ensure that the excavator bucket delivers the correct amount of payload to meet the capacity of the truck tray. These systems often use RFID tags, or similar communication technology, located on the truck that communicate truck identification data to a receiver on the excavator. A payload management system on the excavator then uses the truck identification data to determine the payload capacity of the truck.

Furthermore, the payload management system on the excavator is able to calculate the payload delivered by the excavator bucket in real time as the bucket completes each dig/dump pass. In this way, when the payload management system determines that the truck requires further payload to fill it to capacity that is equal to or less than the payload capacity of the excavator bucket, the payload management system provides feedback to the operator of the excavator to ensure that only enough payload is collected in the last dig/dump pass to fill the truck tray to capacity, no less and no more. Similarly, the payload management system provides feedback to the operator of the excavator of all loads that are being placed into the truck in real time, together with the capacity of the truck and a running update on the remaining payload to fill the truck to capacity, allowing the operator to plan the size of the bucket loads for the filling of the truck in a more optimal manner based on the specific conditions that the excavator and truck are working in. Once filled, the truck moves the earthen material to its destination and the next truck is driven from the waiting queue to the load location for the excavator so that its tray can be filled to capacity.

As such, it is critical that the payload management system of the excavator accurately identifies the truck that is currently being filled by the excavator. As mentioned, it is known to use RFID tags to communicate truck identification data from the truck to the receiver on the excavator for use by the excavator's payload management system. However, as there are a number of trucks within range of the excavator's receiver the payload management system needs to determine which of the received truck identification signals is associated with the truck that is currently being loaded by the excavator, as opposed to a truck that is in the queue that is waiting to be loaded.

In an attempt to overcome these problems, it is known for payload management systems to use the signal strength of the signal received from the truck transmitter in an attempt to identify the truck that is currently being loaded. These systems work on the basis that the strongest signal received by the receiver of the excavator is most likely the truck that is currently being filled as that truck is the closest to the excavator. However, these systems are still subject to error, particularly when the truck queue is equidistant from the excavator as the truck being filed, but on a different side of the excavator.

Other systems are known that use both the signal strength of the identification signal received from the truck as well as data from the payload management system associated with behaviour of the excavator. For example, the excavator may have a receiver on either side of the excavator, and the payload system would only then determine the strongest signal strength at the point in the dig/dump cycle shortly before the excavator dumps the earthen material in the truck tray.

Whilst an improvement over using signal strength alone, these systems are complex to implement and are still subject to error as environmental features can affect the ability to accurately determine signal strength.

Furthermore, known systems still have difficulty in consistently accurately identifying a truck that is being loaded, particularly given the harsh environment that exists on a mine site in proximity to a working excavator.

It is an object to overcome or at least ameliorate one or more of the deficiencies of the prior art described above and/or provide the consumer with a useful commercial choice.

SUMMARY

In one form, although it need not be the only form or indeed the broadest form, the invention relates to an equipment identification system, the equipment in the form of a truck, the system comprising:

a sensor located on the truck, the sensor configured to sense movement of the truck and generate movement data associated with the truck;

a transmitter configured to transmit truck identification data associated with the truck and the movement data;

a receiver in communication with the transmitter, the receiver configured to receive the truck identification data and the movement data from the transmitter; and a management system in communication with the receiver, the management system configured to identify the truck and also determine whether the truck is currently being loaded by an excavator based on the truck identification data and the movement data.

Preferably, the sensor is in the form of an accelerometer and the movement data is in the form of acceleration, deceleration and vibration data observed by the accelerometer.

Suitably, the receiver and management system are located on the excavator.

Preferably, the management system is in communication with a datastore that contains payload information of a tray of the truck associated with the truck identification data. Suitably, the payload information includes payload capacity of the tray of the truck.

Alternatively, payload information of a tray of the truck associated with the truck identification data is transmitted by the transmitter. The payload information may form part of the truck identification data. Suitably, the payload information includes payload capacity of the tray of the truck. The transmitter and sensor may be located on the tray itself, such that when the tray is moved between trucks, the payload information associated with the tray capacity is also transferred to the new truck.

Preferably, the management system includes a payload management system able to calculate the payload carried in a bucket of the excavator. Suitably, the payload management system is able to dynamically calculate the payload carried in the bucket of the excavator as the excavator moves between the dig phase and the dump phase.

Optionally, the management system is configured to also receive data associated with the behaviour of the excavator and is able to determine the current stage the excavator is in the dig/dump cycle. Suitably, the management system is configured to identify the truck and also determine whether the truck is currently being loaded by an excavator based on the truck identification data and the movement data during each dig/dump cycle. Suitably, the management system continuously determines whether the truck is currently being loaded.

Alternatively, the management system is configured to identify the truck and also determine whether the truck is currently being loaded only on the first dig/dump cycle.

The management system may also be of a non-payload related form, that performs calculations or provides output upon which the identity of the vessel being loaded is of interest. In a more preferred form, the management system detects the loss of component(s) from the excavator, such as a tooth or the like, and also uniquely identifies the truck, hopper or other loading vessel that was having payload delivered to it by the excavator at the point in time that the loss occurred.

Optionally, the management system calculates the strength of a signal carrying the truck identification data and the movement data that is communicated from the transmitter and received at the receiver. Suitably, the management system is configured to identify the truck and also determine whether the truck is currently being loaded by an excavator based on the truck identification data, the movement data and the strength of the signal communicated from the transmitter to the receiver.

Preferably, the receiver is in communication with two or more transmitters, each associated with a respective truck and configured to transmit truck identification data and movement data associated with the truck.

Suitably, the management system stores the movement data of each truck in association with the truck identification data of the truck together with time data associated with the time the movement data was captured by the sensor on the truck. The time data may be communicated from the transmitter to the receiver. Alternatively, the time data may be determined by the management system. In one form, the time data may be determined by the management system based on when the communication was received. Suitably, the management system is in communication with a datastore and is configured to store the movement data and the time data in association with the truck identification data.

In a further form, although not necessarily the broadest or indeed the only form, the invention resides in a method of identifying equipment, the equipment in the form a truck, the method including the steps of:

- receiving truck identification data associated with a truck and movement data associated with the truck;
- identifying the truck based on the truck identification data; and
- determining whether the truck is currently being loaded based on the movement data.

Preferably, the movement data is in the form of acceleration, deceleration and vibration data and/or changes in angular rates of movement to determine rotation observed by a sensor located on the truck and/or a tray of the truck.

Suitably, the method further includes the step of validating that a truck that has been previously determined to be a truck being loaded by the excavator is still the truck currently being loaded, and if so, undertaking the determination step again on a subsequent dig/dump pass by the excavator.

In still a further form, the invention relates to an equipment identification system, the system comprising:

- a sensor located on the equipment, the sensor configured to sense movement of the equipment and generate movement data associated with the equipment;
- a transmitter configured to transmit equipment identification data associated with the equipment and the movement data;
- a receiver in communication with the transmitter, the receiver configured to receive the equipment identification data and the movement data from the transmitter; and
- a management system in communication with the receiver, the management system configured to identify the equipment and determine a current status of the equipment based upon the movement data.

Preferably, the movement data is indicative that the equipment has been moved and the management system then is able to determine an inventory status of the equipment.

Further features of the invention will become apparent from the following description.

BRIEF DESCRIPTION OF THE DRAWINGS

The following figures form part of the present specification and are included to further demonstrate certain aspects of the present disclosure. The disclosure may be better understood by reference to one or more of these figures in combination with the detailed description of specific embodiments presented herein.

DETAILED DESCRIPTION

The present disclosure pertains to an equipment identification system and method of identifying equipment. Systems and methods are described below with reference to equipment in the form of trucks being loaded with earthen material by an excavator. A skilled person will understand that the system/method may equally be applicable to other mobile equipment such as trains and the like. Furthermore, a skilled person will understand that equipment other than excavators may be undertaking the loading such as cranes and the like.

Furthermore, in the context of payload of either a bucket or a truck the reference should be construed to a reference to weight, volume or both.

Figure 1:
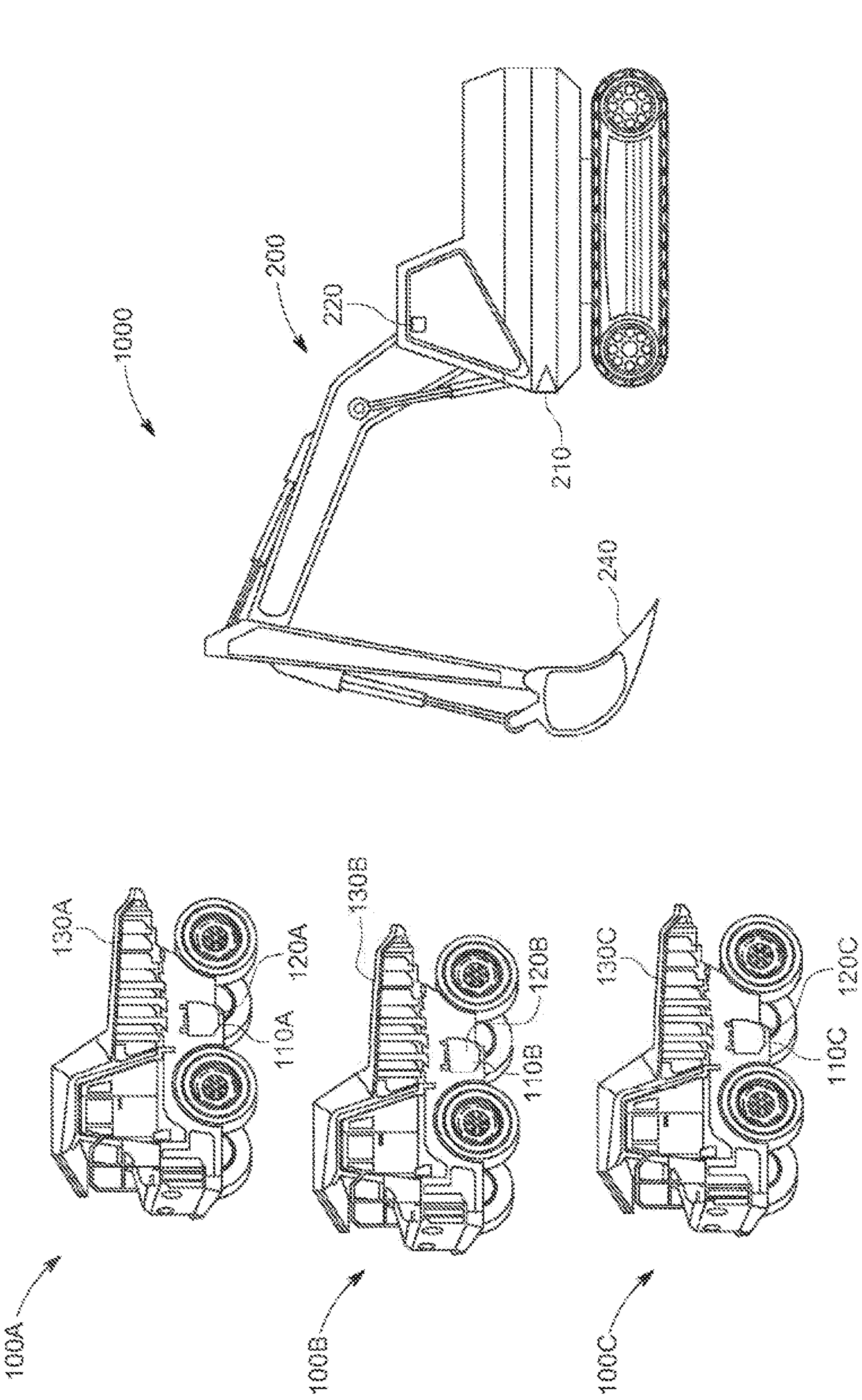
FIG. 1 shows a pictorial view of trucks and an excavator to which an equipment management system is applied.
Figure 2:
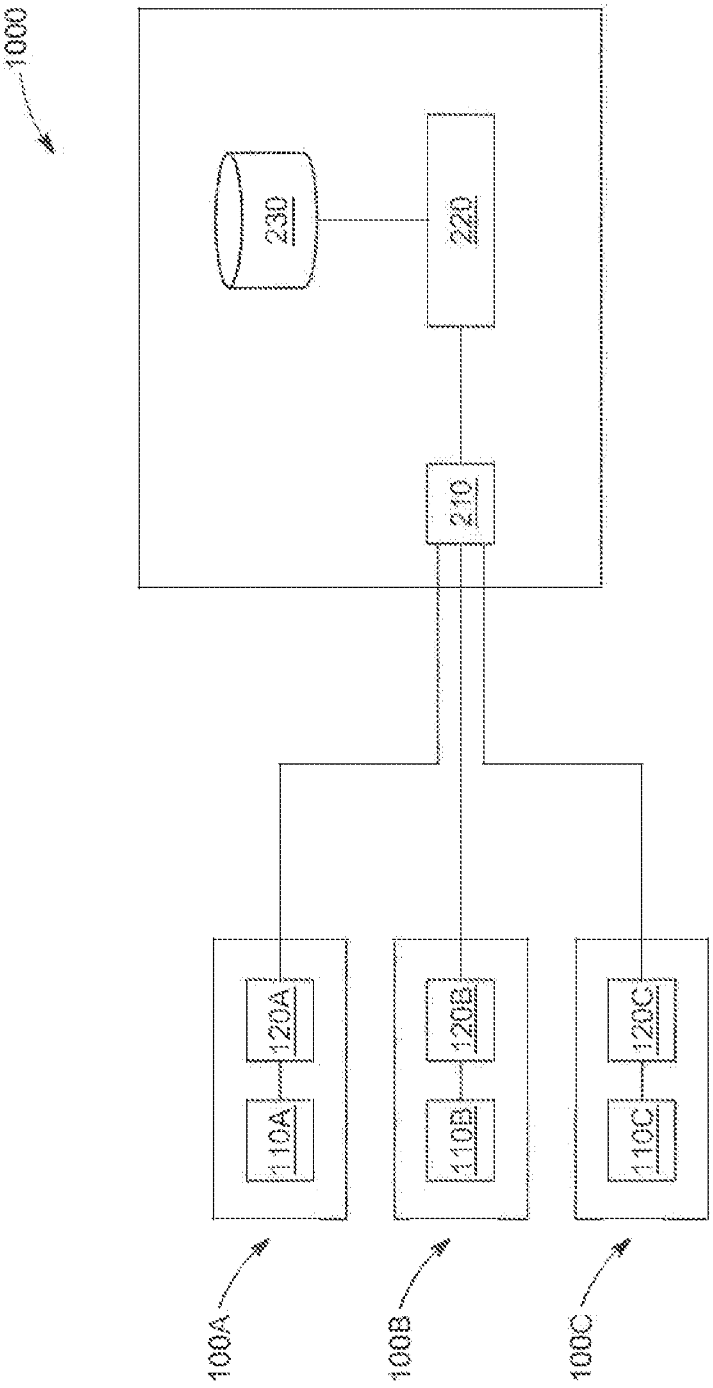
FIG. 2 shows a schematic view of the equipment management system according to one disclosed embodiment.

FIG. 1 shows a pictorial view of trucks 100A-C and an excavator 200 to which the equipment management system in the form of a truck identification system 1000 according to an embodiment of the invention is applied. FIG. 2 shows a schematic view of the equipment managed system, in the form of truck identification system 1000.

A sensor 110A-C is located on each respective truck 100A-C. In the embodiment, each sensor 110A-C is in the form of an accelerometer. The sensors 110A-C are located on their respective trucks 100A-C at a suitable location so as to accurately measure vibration and acceleration as experienced by the truck through movement of the truck and during loading. In a preferred form the sensors 110A-C are located on the chassis or truck tray of their respective trucks 100A-C. The sensors then generate movement data associated with the truck based on the acceleration, deceleration and vibration experienced by the truck and sensed by the sensors as will be discussed in greater detail below.

In a further embodiment, there may be multiple sensors 110A-C on each respective truck 100A-C with those sensors secured to each truck at different locations and being in communication to more accurately assess acceleration and vibration as experienced by the truck and generate movement data associated with the truck.

A transmitter 120A-C is located on each respective truck in communication with the relevant sensor 110A-C. In the embodiment, the transmitters 120A-C are in the form of RFID tags as is known in the art and each RFID tag has stored therein truck identification data that uniquely identifies each truck 100A-C. The transmitters 120A-C are also adapted to communicate data to a remote receiver by way of radio frequency as is known in the art.

Each sensor 110A-C is in communication with its respective transmitter 120A-C and communicates the movement data associated with the respective truck as sensed by sensors 100A-C to the transmitter 120A-C as will be discussed in greater detail below.

As such, each transmitter 120A-C communicates truck identification data that uniquely identifies a respective truck 100A-C and movement data associated with a respective truck 100A-C sensed by the respected sensor 110A-C to a receiver 210 located on the excavator 200 as discussed in greater detail below.

Each truck 100A-C also has a truck tray 130A-C that has a payload capacity. It will be appreciated that each truck 100A-C may have a truck tray 130A-C with a payload capacity that is different to each other truck.

An excavator 200 is also shown in FIGS. 1 and 2. Relevantly, excavator 200 has a receiver 210, a management system 220, a data store 230 and a bucket 240.

Receiver 210 is in the form of a radio frequency receiver and is secured to the excavator. Receiver 210 is adapted to receive truck identification data and movement data associated with each respective truck communicated from transmitters 120A-C.

A skilled addressee will appreciate that the transmitters and receivers may be configured to communicate using communication technologies other than radio frequency as described in the current embodiment.

A management system 220 is in communication with receiver 210 and is adapted to receive the truck identification data and movement data associated with each truck 100A, 100B or 100C when the transmitters 110A-C of those trucks are in range of the receiver 210.

Management system 220 is configured to identify each truck 100A-C and also determine which of trucks 100A, 100B or 100C is currently being loaded by excavator 200 based on the truck identification data and the movement data received by receiver 210 from each of transmitters 120A-C as will be discussed in greater detail below.

Management system 220 is in communication with datastore 230. Datastore 230 has stored therein payload information for each tray 130A-C of each respective truck 100A-C in association with the truck identification data received by receiver 210 from each transmitter 120A-C. That payload information includes information regarding the payload capacity of each truck tray 130A-C. For example, in the case of truck 100A, receiver 210 is adapted to receive truck identification data from transmitter 110A that uniquely identifies truck 100A. Datastore 230 has stored therein payload capacity data associated with tray 130A of truck 100A and management system 220 is able to communicate with data store 230 to receive that information.

Furthermore, in some embodiments, management system 220 is in communication with data store 230 to store within the data store 230 movement data associated with each of trucks 100A-C. As such, for each unique truck identifier stored in the data store, there is also stored movement data related to the movement of the truck 100A-C as received by receiver 210. In some embodiments, time data indicative of the time the movement data was sensed by each sensor 110A-C and communicated to management system 220 by way of transmitters 120A-C and receiver 210 is also stored in datastore 230 by management system 220.

Excavator 200 also has a bucket 240. Excavator 200 utilises bucket 240 to dig earthen material and then transport that earthen material payload by rotating the excavator 200 or the excavator arm from the dig area to the dump area where a truck 100A, 100B or 100C is waiting to have its truck tray loaded. The excavator 200 then delivers the payload from the excavator bucket 240 to the tray of whichever truck 100A, 100B or 100C is currently being loaded.

In some embodiments, management system 220 and data store 230 are located remote from excavator 200. In other embodiments, only data store 230 is remote from excavator 200. Similarly, it is contemplated that receiver 210 may be mounted other than on excavator 200. Data transmitted to receiver 210 is ultimately stored in data store 230 for further analysis. Such data includes data as previously described but may also include data associated with when the truck is dumping. In some embodiments, the management system determines when the truck is dumping by receiving movement data associated from the truck and interpreting that data to recognise that a dumping motion is occurring.

In this way further analysis can be conducted to determine performance of each of the trucks. Such performance includes cycle times of the truck from fully loaded, to dumping to return to be loaded conditions. A remote data store may receive data from multiple management systems. Similarly, a remote management system may perform the identification operation for multiple excavators.

In some embodiments, management system 220 includes a payload management system capable of calculating the actual payload carried by the excavator bucket 240 between dig and dump utilising sensors on the excavator, excavator arm and/or excavator bucket. In this way, management system 220 is able to dynamically track and determine the amount of payload delivered by the excavator bucket to a particular truck tray 130A-C. In other embodiments, management system 240 estimates the amount of payload delivered to the truck tray 130A, 130B or 130C currently being loaded based on the payload capacity of the excavator bucket 240 and the number of dig/dump passes the excavator has undertaken.

Figure 3:
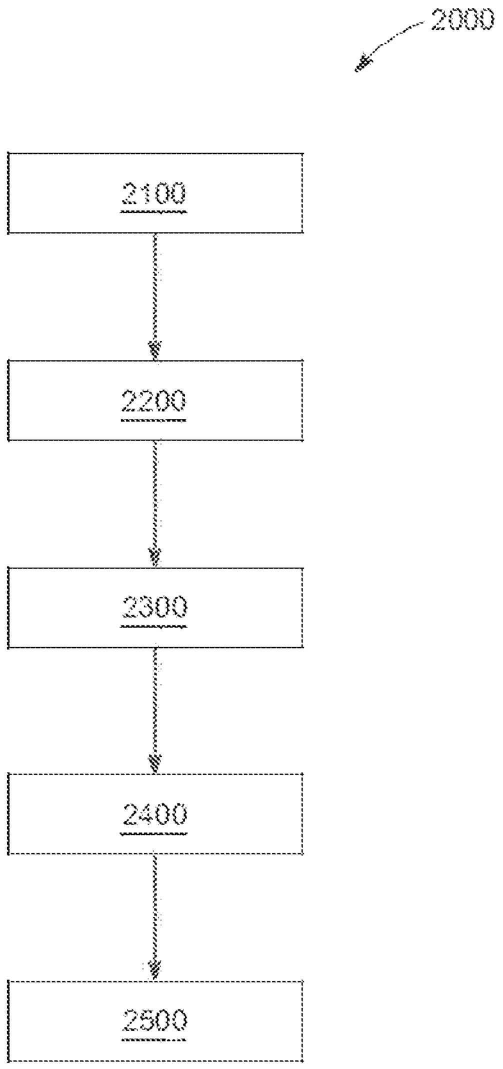
FIG. 3 shows a flowchart representing a method of identifying equipment according to a further aspect of disclosed system and method.

As previously discussed, management system 220 is configured to identify each truck 100A-C and also determine which of trucks 100A, 100B or 100C is currently being loaded by excavator 200 based on the truck identification data and the movement data received by receiver 210 from each of transmitters 120A-C. FIG. 3 shows a method 2000 of identifying equipment in the form of trucks according to an embodiment of the invention.

Method 2000 commences with step 2100 in FIG. 3. Step 2100 involves one of sensors 110A-C detecting data in relation to the vibration, acceleration and/or movement of the respective truck 100A-C. For example, truck 100A may be accelerating from a starting position, this movement is sensed by the sensor 110 in the form of accelerometer and the sensor then generates movement data that is representative of that acceleration. Other examples of the types of movement the truck experienced that are sensed by sensor 110A include deceleration, no acceleration which represents either movement at constant velocity or that the truck has stopped, vibrations with no acceleration or deceleration, vibrations with acceleration, deceleration or vibrations as a result of payload material being dumped into the truck tray and changes in acceleration or angular rates and thus orientations due to changes in orientation due to, for example, the truck tray being rotated for dumping purposes.

A skilled addressee will appreciate that other movement data associated with the truck may be generated by the sensors. Furthermore, in circumstances where the sensors are in the form of other types of sensors, such as temperature, movement can be inferred and movement data communicated to transmitters on this basis.

Step 2200 involves the respective transmitter 120A-C receiving the movement data from its respective sensor 120A-C and then communicating that movement data together with truck identification data that uniquely identifies the relevant truck 100A-C. As discussed, in an embodiment, the transmitter takes the form of a RFID transmitter. The transmitter 120A of truck 100A receives movement data from the sensor 110A and then transmits that movement data together with truck identification data that uniquely identifies the truck. The truck identification data may, for example, take the form of a number that uniquely identifies the truck 100A or that uniquely identifies the sensor, such that the truck can be identified by association.

In a preferred form, each transmitter 120A-C transmits the movement data and the truck identification data every time each transmitter 120A-C receives movement data from its respective sensor 110A-C. Alternatively, each transmitter 120A-C may transmit the movement data and the truck identification data only at defined intervals of time. In other embodiments, each transmitter 120A-C may transmit the most recently received movement data and the truck identification data continuously. In other embodiments, each transmitter 120A-C may store the movement data with or without associated time data and transmit that data upon receipt of a command to do so. The stored data may be automatically deleted in in time order with the oldest deleted first to conserve storage space if no transmit command is received. In other embodiments, a combination of the above may be employed, for example: to ensure robustness of the communication.

Step 2300 involves the receiver 210 of the excavator 200 receiving the movement data and truck identification data communicated from each transmitter 120A-C. It will be appreciated that the receiver 210 may receive data from all of the trucks 100A-C at the same time (or virtually the same time) or may only receive data from a single truck such as, for example, truck 100A. The embodiment is described with reference to three trucks 100A-C but a skilled person will appreciate that the system and method of the invention may be applied to any number of trucks.

Step 2400 involves the management system 220, identifying the truck 100A, 100B or 100C based on the truck identification data received by receiver 210. In the embodiment, the management system 220 undertakes this identification step each time the receiver 210 receives transmitted data. In other embodiments, this identification step may not take place every time data is received by the receiver 210. For example, it may take place only after an event that is expected to produce a change in the movement data. For example, this identification step may suitably only be undertaken in receipt of movement data indicative of the truck receiving or dumping material.

In the embodiment, management system 220 undertakes this identification step by the management system 220 communicating with the data store 230 to associate the truck identification data to identify the truck based on data in the data store. Alternatively, the data store may not be required to identify the truck, as all relevant identification data may be stored in memory on the sensor/transmitter and communicated to the management system.

As previously mentioned, the data store 230 may also, in certain embodiments, store information relevant to each truck 100A, 100B and 100C such as past movement data, time data associated with the past movement data, payload capacity of the truck tray and other characteristics of or associated with the truck. Embodiments of the invention contemplate other data associated with each truck 100A-C being stored in the data store 230 by the management system 220. Furthermore, management system 220 is able to communicate with data store to store new data, including movement data and time data corresponding to the movement data in association with the relevant truck identification data in the data store uniquely identifying the truck 100A, 100B or 100C.

Once the truck 100A, 100B or 100C has been identified by the management system 200, then, in step 2500, 2500 management system determines whether the truck 100A, 100B or 100C is currently having its truck tray loaded by the excavator 200.

In one embodiment, once the management system 220 has identified a particular truck, for example truck 100A, the step of determination is carried out by interrogating the movement data received by the transmitter. For example, if the movement data shows that the truck is not accelerating or decelerating then, on that basis, the management system 220 determines that the identified truck is currently being loaded by the excavator.

Alternatively, the management system may, upon receipt of new movement data, interrogate past movement data stored in data store 230 to determine whether the identified truck is currently being loaded by the excavator. For example, if the immediate past movement data stored in association with the truck identification data shows acceleration, deceleration and then idle then, on that basis, the management system 220 determines that the identified truck is currently being loaded by the excavator.

In other embodiments, where the management system 230 is configured to receive behaviour data of the excavator 200 such as data associated with when the excavator is dumping payload in a truck tray, the management system analyses received movement data at the point in time when the dump stage is occurring to determine whether the truck identified is the truck currently being loaded. When payload is delivered to a truck the delivery is accompanied with a load in the truck tray that is detectable as movement by a sensor in the form of an accelerometer.

In still further embodiments, the management system utilises a neural network that assess prior movement data of a truck associated with the track identification data stored in the data store 230 to determine when the truck is being loaded by the excavator. Such embodiments may include a training set of movement data for each truck so that movement data consistent with loading for each truck can be determined. In still further embodiments, the management system compares movement data from when the truck is not being loaded to the data from when the truck is being loaded and identifies the truck based on which truck has a statistically significant variation in the movement data that correlates to the time of the dump. Such a test can be used to quantify the statistical significance with a probability. The probability may be used to differentiate between not only which truck is likely to be the truck currently being loaded, but also if it is likely that no truck is being loaded at all. The certainty of correctness of the truck identification can be made by combining historical probabilities from multiple dump events, for example by Baysian statistical combination and the like.

The system and method of the invention is able to accurately identify a truck being filled by an excavator as distinct from a truck waiting to be filled so as to ensure that the truck tray of the truck being filled is only filled to or near capacity. By accurately identifying the truck being filled and determining the payload of the truck's tray the management system is able to provide feedback to the operator as to the amount of payload that should be dumped on into the truck tray. In other embodiments, the management system controls the dig/dump process to automatically fill the truck to or near capacity.

In other embodiments, the management system may be of a non-payload related form, that performs calculations or provides output upon which the identity of the vessel being loaded is of interest, such as a system that detects the loss of components from the excavator and whereby it is useful to know into which truck, hopper or other loading vessel received the lost component.

In still other embodiments, the combination of movement data and identification data can be applied to many different types of equipment management applications, such as inventory management whereby when the receiver receives movement data in association with equipment identification data, the management system can then determine that the equipment associated with received equipment identification data has been moved and then changes the status of that equipment in a data store that acts as an inventory management data store.

Furthermore, in certain embodiments, the management system can use changes in moment data over time to determine a possible change in the reliability of the equipment.

Furthermore, in certain embodiments, the management system can use changes in movement data over time, correlated with a source of payload data and the time that the truck was being loaded, to determine an estimate of the amount of material in the truck and/or the amount of material loaded into the truck in a particular bucket load.

It will be appreciated that the management system 230 may be located remote from the excavator and communicates with the excavator by way of a separate receiver and transmitter.

A skilled addressee will appreciate that any other sensor capable of measuring the vibration or acceleration or motion of the truck may equally be utilised in the identification system 1000 of the invention.

By "about" or "approximate" and their grammatically equivalent expressions is meant a quantity, level, value, number, frequency, percentage, dimension, size, amount, abundance, concentration, weight or length that varies by as much 15, 14, 13, 12, 11, 10, 9, 8, 7, 6, 5, 4, 3, 2 or 1% to a reference quantity, level, value, number, frequency, percentage, dimension, size, amount, abundance, concentration, weight or length.

Throughout this specification, unless the context requires otherwise, the words "comprise", "comprises" and "comprising" will be understood to imply the inclusion of a stated step or element or group of steps or elements but not the exclusion of any other step or element or group of steps or elements. Thus, use of the term "comprising" and the like indicates that the listed elements are required or mandatory, but that other elements are optional and may or may not be present.

The invention claimed is:

1. An equipment identification system, the equipment in the form of a truck, the system comprising:

a sensor located on the truck, the sensor configured to sense movement of the truck and generate movement data associated with the truck;

a transmitter configured to transmit truck identification data associated with the truck and the movement data;

a receiver in communication with the transmitter, the receiver configured to receive the truck identification data and the movement data from the transmitter; and a management system in communication with the receiver, the management system configured to identify the truck and also determine whether the truck is currently being loaded by an excavator based on the truck identification data and the movement data, wherein the management system is further configured to receive data associated with the behaviour of the excavator and is able to determine the current stage the excavator is in in the dig/dump cycle, wherein the management system is in communication with a datastore that contains payload information of a tray of the truck associated with the truck identification data and wherein the payload information includes payload capacity of the tray of the truck, wherein the management system includes a payload management system configured to calculate an amount of payload carried in a bucket of the excavator using at least one sensor on the excavator to track and determine the amount of payload delivered to the tray of the truck, and wherein the management system is further configured to provide feedback to an operator of the excavator indicative of the amount of payload that should be dumped on the tray of the truck to fill to or near the capacity of the tray of the truck.

2. The equipment identification system of claim 1, wherein the sensor is in the form of an accelerometer and the movement data is in the form of acceleration, deceleration and vibration data observed by the accelerometer.

3. The equipment identification system of claim 1, wherein the receiver and management system are located on the excavator.

4. The equipment identification system of claim 1, wherein payload information of the tray of the truck associated with the truck identification data is transmitted by the transmitter.

5. The equipment management system of claim 4, wherein the payload information includes payload capacity of the tray of the truck.

6. The equipment management system of claim 1, wherein the sensor and the transmitter are located on a tray of the truck.

7. The equipment management system of claim 1, wherein the management system is configured to identify the truck and also determine whether the truck is currently being loaded by an excavator based on the truck identification data and the movement data during each dig/dump cycle.

8. The equipment management system of claim 1, wherein the management system calculates the strength of a signal that is communicated from the transmitter and received at the receiver carrying the truck identification data and the movement data.

9. The equipment management system of claim 8, wherein the management system is configured to identify the truck and also determine whether the truck is currently being loaded by an excavator based on the truck identification data, the movement data and the strength of the signal communicated from the transmitter to the receiver.

10. The equipment management system of claim 1, wherein the management system stores the movement data of each truck in association with the truck identification data of the truck together with time data associated with the time the movement data was captured by the sensor on the truck.

11. The equipment management system of claim 1, wherein the management system is in communication with a datastore and is configured to store in the data store the received movement data in association with the truck identification data.

12. The equipment management system of claim 1, wherein the management system is in communication with a datastore that contains prior movement data of the truck associated with the truck identification data and the management system utilises a neural network to assess the prior movement data to determine whether the truck is being loaded by the excavator.

13. The equipment management system of claim 1, wherein the neural network has been trained using a training set of movement data associated with the truck identifier.

14. The equipment management system of claim 1, wherein the management system is in communication with a datastore that contains prior movement data of the truck associated with the truck identification data, the movement data indicating an indication as to whether each item of movement data correlates to when the truck is being loaded and also when the truck is not being loaded, and the management system utilises statistical data analysis techniques to integrate the movement data in the data store and the received movement data to determine whether the truck is being loaded by the excavator.

15. A method of identifying equipment, the equipment in the form a truck, the method including the steps of:

receiving truck identification data associated with a truck and movement data associated with the truck;

identifying the truck based on the truck identification data;

determining whether the truck is currently being loaded by an excavator based on the movement data; and determining the current stage in which the excavator is in the dig/dump cycle, wherein the management system is in communication with a datastore that contains payload information of a tray of the truck associated with the truck identification data and wherein the payload information includes payload capacity of the tray of the truck, wherein the management system includes a payload management system configured to calculate an amount of payload carried in a bucket of the excavator using the movement data associated with the truck to track and determine the amount of payload delivered to the tray of the truck, and wherein the management system is further configured to provide feedback to an operator of the truck indicative of the amount of payload that should be dumped on the tray of the truck to fill to or near the payload capacity of the tray of the truck.

16. The method of claim 15, wherein the movement data is in the form of acceleration, deceleration and/or vibration data and/or changes in angular rates of movement to determine rotation observed by a sensor located on the truck and/or a tray of the truck.

17. The method of claim 15, further including the step of validating that a truck that has been previously determined to be a truck being loaded by the excavator is still the truck currently being loaded, and if so, undertaking the determination step again on a subsequent dig/dump pass by the excavator.

18. An equipment identification system, the system comprising:

a sensor located on the equipment, the sensor configured to sense movement of the equipment and generate movement data associated with the equipment;

a transmitter configured to transmit equipment identification data associated with the equipment and the movement data;

a receiver in communication with the transmitter, the receiver configured to receive the equipment identification data and the movement data from the transmitter; and a management system in communication with the receiver, the management system configured to identify the equipment and determine a current status of the equipment based upon the movement data, wherein the management system is further configured to receive data associated with the behaviour of an excavator responsible for loading the equipment with payload and is able to determine the current stage the excavator is in in the dig/dump cycle, wherein the management system is in communication with a datastore that contains payload information of a tray of the truck associated with the truck identification data and wherein the payload information includes payload capacity of the tray of the truck, wherein the management system includes a payload management system configured to calculate an amount of payload carried in a bucket of the excavator using at least one sensor on the excavator to track and determine the amount of payload delivered to the tray of the truck, and wherein the management system is further configured to provide feedback to an operator of the excavator indicative of the amount of payload that should be dumped on the tray of the truck to fill to or near the capacity of the tray of the truck.

* * * * *